United States Patent [19]
Savitsky et al.

[11] Patent Number: 5,417,391
[45] Date of Patent: May 23, 1995

[54] METHOD FOR CONTROL OF THE BOUNDARY LAYER ON THE AERODYNAMIC SURFACE OF AN AIRCRAFT, AND THE AIRCRAFT PROVIDED WITH THE BOUNDARY LAYER CONTROL SYSTEM

[75] Inventors: Anatoly I. Savitsky, Moscow; Lev N. Schukin, Kaliningrad; Viktor G. Karelin, Moscow; Aleksandr M. Mass, Petropavlosk-Kamchatsk; Rostislav M. Pushkin; Anatoly P. Shibanov, both of Krasnoarmeisk; Ilya L. Schukin, Kaliningrad; Sergei V. Fischenko, Primorsko-Akhtarsk, all of Russian Federation

[73] Assignee: Nauchno- proizvodstvennoe predpriyatie "Triumf", Mytischi, Russian Federation

[21] Appl. No.: 70,417

[22] Filed: Jun. 3, 1993

[30] Foreign Application Priority Data

Oct. 14, 1991 [SU] U.S.S.R. ............ 5004219/23
Oct. 14, 1991 [SU] U.S.S.R. ............ 5004220/23

[51] Int. Cl.$^6$ ................ B64C 23/06; B64C 21/06
[52] U.S. Cl. .................... 244/199; 244/208; 244/209
[58] Field of Search ............ 244/199, 208, 209

[56] References Cited

U.S. PATENT DOCUMENTS

| | | | |
|---|---|---|---|
| 2,041,793 | 5/1936 | Stalker | 244/199 |
| 2,406,916 | 9/1946 | Stalker | 244/208 |
| 2,511,504 | 6/1950 | Hawkins | 244/208 |
| 2,894,703 | 7/1959 | Hazen et al. | |
| 2,939,650 | 6/1960 | Coanda | 244/208 |
| 3,012,740 | 12/1961 | Wagner | 244/208 |
| 3,077,321 | 2/1963 | Dunham | |
| 3,831,885 | 8/1974 | Kasper | |
| 4,587,803 | 5/1986 | Nightingale et al. | 244/23 D |
| 4,664,345 | 5/1987 | Lurz | 244/199 |
| 4,671,474 | 6/1987 | Haslund | |

FOREIGN PATENT DOCUMENTS

| | | |
|---|---|---|
| 584585 | 6/1929 | Germany . |
| 1273338 | 2/1969 | Germany . |
| 2178131 | 6/1985 | United Kingdom . |

Primary Examiner—Andres Kashnikow
Assistant Examiner—Virna Lissi Mojica
Attorney, Agent, or Firm—Collard & Roe

[57] ABSTRACT

A method and apparatus for boundary layer control by sucking air off the vortex chambers established in the trailing-edge portion of an aircraft aerodynamic surface. The rate of air bleed is controlled first by increasing it until the boundary layer is attached to the airstreamed surface, then by decreasing the rate of air bleed until the pressure in the trailing-edge aircraft portion starts decreasing. The aircraft equipped with the boundary layer control system, including a number of vortex chambers accommodating streamlined bodies and communicating, through a common passage and a receiver, with a low-pressure source.

11 Claims, 4 Drawing Sheets

METHOD FOR CONTROL OF THE BOUNDARY LAYER ON THE AERODYNAMIC SURFACE OF AN AIRCRAFT, AND THE AIRCRAFT PROVIDED WITH THE BOUNDARY LAYER CONTROL SYSTEM

TECHNICAL FIELD

The present invention relates to aeronautics and has particular reference to methods for control of the boundary layer on the aerodynamic surface of an aircraft and to the construction of such an aircraft equipped with the boundary layer control (BLC) system.

BACKGROUND ART

It is common knowledge that a measure of perfect aerodynamic performance characteristics of an aircraft depends on the aerodynamic fineness (lift-to-drag) ratio $K=C_L/C_D$, where $C_L$ and $C_D$ are the aerodynamic lift and the aerodynamic drag coefficients, respectively.

It ensues from the definition of the aerodynamic fineness ratio that in order to attain high values of K it is necessary either to reduce the aerodynamic drag of an aircraft or to increase its aerodynamic lift.

The lift can be increased by increasing the angle of attack of the aircraft lifting surfaces. However, with an increased angle of attack, a positive pressure gradient arises on the trailing surface of the wings directed along the airflow about the wing. At definite levels of said positive pressure gradient the airflow is incapable of moving against the positive pressure gradient due to its having inadequate kinetic energy near the wing surface and is separated from the latter.

Such an airflow separation results in a badly increased aerodynamic drag of the aircraft construction members streamed with the airflow and in a reduced lift of the aerodynamic lifting surfaces (i.e., wings and fuselages), that is $C_D$ increases, $C_L$ decreases, with the result that the aerodynamic fineness ratio K is reduced too.

To ensure against aerodynamic stall and improve aircraft aerodynamic characteristics, as well as those of other aircraft, the wall boundary layers of the airflow are sucked off, thus increasing the kinetic energy of the wall boundary layer and its ability to overcome high pressure gradients.

The present state of the art includes a variety of practical solutions of the problem to the boundary layer control by sucking air off in the wall zone.

One of the prior-art methods for control of the boundary layer is known to effect air sucking off the wall zone through air-bleed orifices provided on the aerodynamic surface of an aircraft (cf. German Patent No. 1,273,338). The method is a highly energy-consuming one since air is bled from the wall zone in a direction normal to the boundary layer. The same disadvantage is inherent in a technical solution pertinent to an aircraft having its fuselage shaped as a thick short-span wing (cf. U.S. Pat. No. 3,077,321) equipped with a boundary layer control device which appears as a boundary-layer-control manifold situated in the aft fuselage and communicating, through suction slots, with the wall airflow zone. Provision is made in the inlet portion of the manifold for a rarefying arrangement to establish rarefaction in the manifold with the aid of a bank of suction fans. The system is, however, too power-consuming due to high power input of the fan drives required for air suction off the low-pressure zones on the aircraft surface and blowing the air in the high-pressure zones near the trailing edge of the aircraft.

Moreover, the required fan input power is increased due to an excessively large amount of air sucked off the low-pressure zone. According to the laws governing boundary layer control, the amount of sucked-off or blow-in air required for establishing a nonseparated airflow increases intensely downstream of the airflow towards the trailing edge. In the boundary layer control discussed above the amount of sucked-off air is equal to the amount of the air blown in the vicinity of the trailing edge. According to the aforesaid law, the amount of sucked-off air in the control system under consideration is to be several times lower than that of the air blown-in near the aircraft rear. Any violation of the boundary layer control law results in higher power consumption for fan drive and affects adversely the aircraft aerodynamic efficiency. An excessively high suction results in a rise of the skin-friction drag.

More advanced are a method and devices for control of the boundary layer, wherein the wall air layer is sucked off using special chambers established in the trailing aerodynamic surface, vortex flows are created in the interior of said chambers, the direction of which in the wall portion of the chamber coincides with the direction of the boundary layer whereby the velocity of the latter increases resulting in a nonseparated flow of an airfoil.

Known in the present state of the art is a device for the boundary layer control operating according to the method described before and having a number of vortex chambers located on the inner side of the air-foil and provided with holes arranged across the external airflow (cf. U.S. Pat. No. 4,671,474).

Vortex motion inside the chambers in maintained due to hydrodynamic interaction of the vortex motion inside the chamber with the external airflow in the zone of the suction holes and at the expense of the power of the air suction source.

However, said device suffers from said disadvantages the principal of which are sophisticated construction, high airfoil drag level, and highly power-consuming suction of the vortex flow.

High drag level results from a considerable airfoil drag due to the poorly streamlined square shape of the chamber and on account of an increased skin-friction drag on the surface of the vortex chambers.

Considerable power consumption for airflow suction is due to a large resistance offered by communication lines connecting the vertex chambers to a low-pressure source. The throttling effect of the communication lines is especially high with respect to a sonic flow made use of in the known device. In addition, at low velocities of the external airflow and small values of the positive pressure gradient, the power system of the device operates in an uneconomic mode, this being due to the fact that the system is adjusted for the maximum airflow velocity and pressure gradient values and therefore sucks air in excess of the necessary amount, which leads to unjustified power consumption.

One more prior-art device for boundary layer control is known to have cylinder-shaped vortex chambers, whereby their profile (form) drag can be reduced (cf. British Patent No. 2,178,131). However, it is due to a small size of the suction slot of communicating the airflow well boundary layer with the vortex chamber that the area of interaction of the airflow in the vortex chamber with the external airflow has but inadequate extent to provide a necessary increase of the airflow velocity in the wall boundary layer thereof to prevent boundary layer separation in case of great positive pressure gradients.

DISCLOSURE OF THE INVENTION

It is a principal object of the present invention to provide such a method for boundary layer control and such an aircraft construction equipped with a device for boundary layer control that ensures nonseparated air flow over an aerodynamic surface in most diverse flight modes of the aircraft with substantially low power consumption.

The foregoing object is accomplished due to the fact that the rate of bleed of the air sucked off the vortex chambers provided in the trailing edge of the aerodynamic surface is controlled as follows; first said rate is gradually increased until vortex flows appear in the chambers, said flows being attached to the boundary layer, then said rate is maintained at a level in which the attached airflow is preserved and a nonseparated flow about the aerodynamic surface occurs.

Used as a controlled parameter by which a nonseparated flow about the aerodynamic surface can be judged, may be the pressure in the aircraft rear, which proves to have a maximum value in case of a nonseparated flow. Thus, its decrease along with a reduction of the air bleed level is indicative that said reduction should be stopped.

Another feature of the proposed method resides in the fact that when the air is sucked off the vortex chambers at minimum rates, said suction is carried out by ejection bleeding, the air being ejected is consecutively added in a common passage to the air bled from the cells located in the direction towards the aircraft trailing-edge portion, that is, air ejection is effected in a direction from the last cell to the first one.

Formation of a common airflow in a direction from the rear cell to the first one enables one to make use of a pressure gradient set on the surface in the nonseparated flow. The airflow sucked off the rear cell bleeds air from the other cells by virtue of the ejector effect, said cells being situated upstream of the airflow towards the first cell and having a lower pressure level than that effective in the rear cell.

A principal characteristic feature of an aircraft comprising a fuselage shaped as a lifting wing, a power plant in the form of turbojet engines, and a gas-dynamic boundary layer control system, incorporating a number of vortex chambers arranged consecutively in the wing trailing-edge portion and communicating with a low-pressure source, according to the present invention, consists in the provision of streamlined bodies located in the interior spaces of the vortex chambers and establishing annular ducts with the walls of the chambers, as well as in the provision of means for control of air-flow velocity in said annular ducts in the boundary layer control system proposed herein.

Provision of said streamlined bodies together with equipping an aircraft with air suction rate control means makes it possible to facilitate establishing a stable attached vortex airflow and maintaining its circulation, as well as to increase the well open portion of the vortex chambers, thereby extending the area of interaction between the airflow in the chambers and the boundary layer. Attempts to increase said area without the provision of streamlined bodies result in that the airflow in the chambers gets split into a number of flows, which affects very badly the efficiency of boundary layer control.

Another feature of the aircraft proposed herein is the communication of the vortex chambers with the low-pressure source through a common passage, wherein said means for control of airflow velocities in the chambers are located, said means including ejectors and controlled butterfly dampers. Said ejectors appear as ducts connecting the vortex chambers with the flow-through portion of the common passage.

In a specific embodiment of the device said common passage may have a receiver in its inlet portion, said receiver being provided with a diffuser at its inlet. The front vortex chamber may be isolated from the flow-through portion of the common passage and may communicate directly with the receiver through a duct admitting air from the receiver to the boundary layer towards the open portion of the interior of said chamber.

Provision of a receiver provides for normal functioning of the boundary layer control system with some of the aircraft engines shut down.

Still another feature of the invention is the provision of slots in the fuselage of the aircraft which communicate the flow-through portion of the common passage with the aircraft rarefaction area and accommodate controlled butterfly dampers. When the inlet portion of the common passage is shaped as a receiver said slots are located in the receiver top wall. Communication established between the common passage flow-through portion or the receiver and the aircraft rarefaction area enables one, under normal operating conditions of the system, to bleed part of the air being sucked off to the low-pressure area in the external airflow streaming the aerodynamic surface which cuts down power consumption for air suction. In addition, when the receiver communicates with the rarefied area this provides for partial functioning of the boundary layer control system with all the aircraft engines shut down.

Yet still more characteristic feature of the proposed aircraft, according to the invention, is the provision of a low-pressure source as an ejector located at the inlet or outlet of aircraft turbojet engine, or else at the outlet of said engine, or in the gas-flow passage thereof. This provides for an efficient source of air suction.

BRIEF DESCRIPTION OF THE DRAWINGS

In what follows the present invention will now be illustrated by a detailed description of a specific exemplary embodiment thereof with reference to the accompanying drawings, wherein.

BEST METHOD OF CARRYING OUT THE INVENTION

Figure 1:
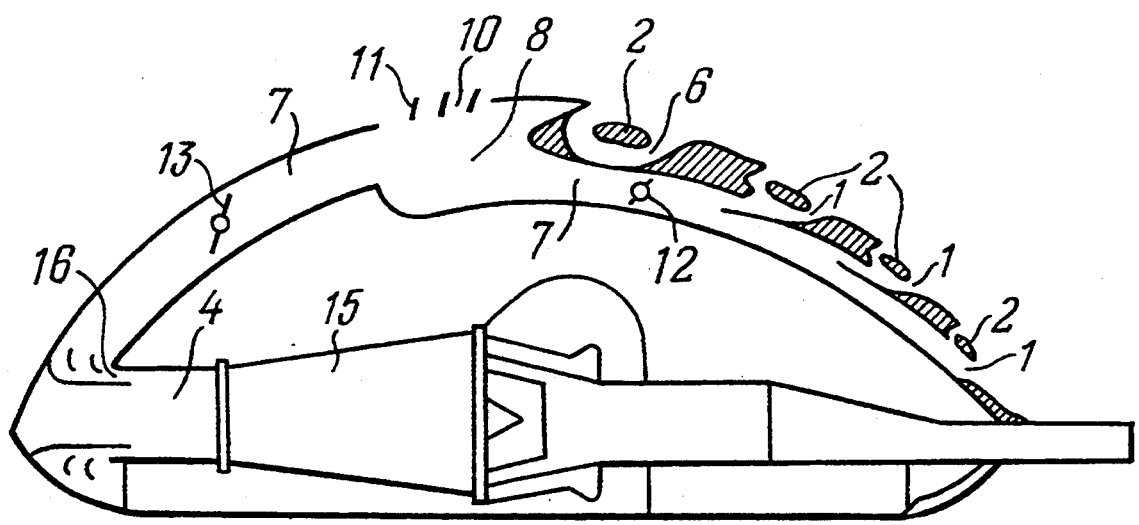
FIG. 1 is a longitudinal sectional view of an aircraft in the form of a thick aerodynamic airfoil provided with a boundary control device having four vortex chambers situated on the airfoil trailing-edge surface.
Figure 3:
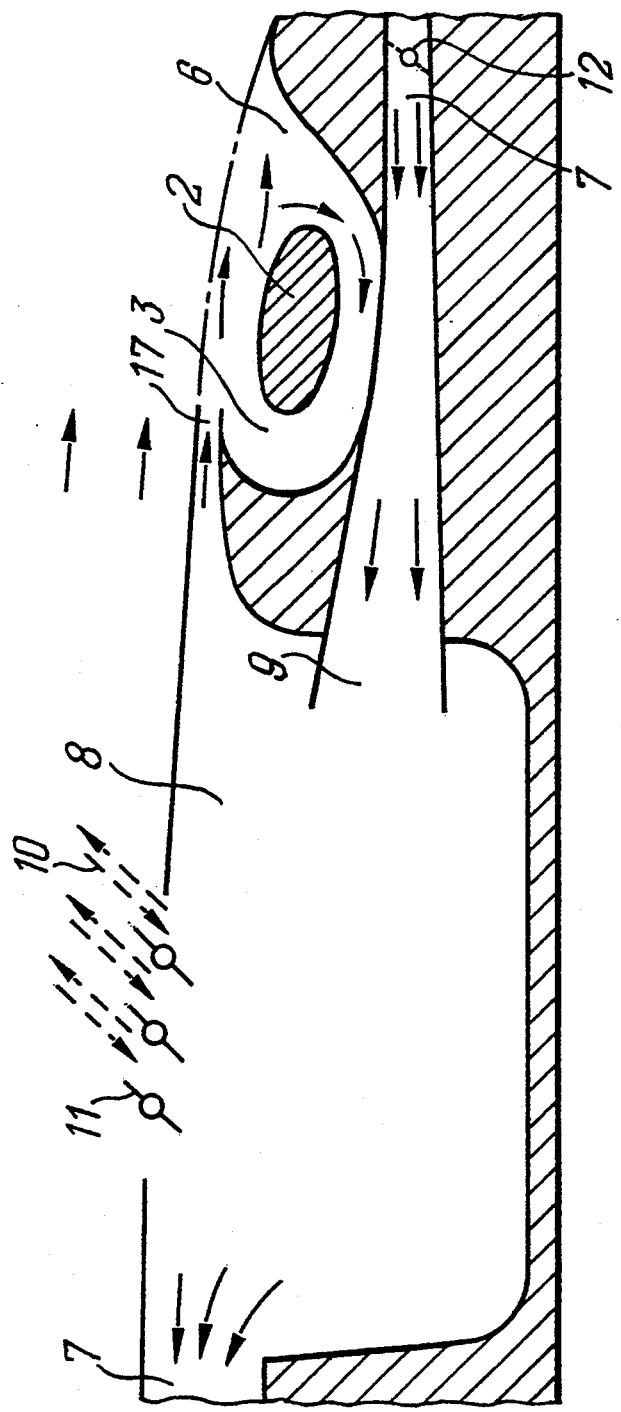
FIG. 3 is a sectional view of a vortex chamber first along the airflow, of a receiver, and of a part of the gas-dynamic passage communicating the vortex chamber with the low-pressure source.
Figure 4:
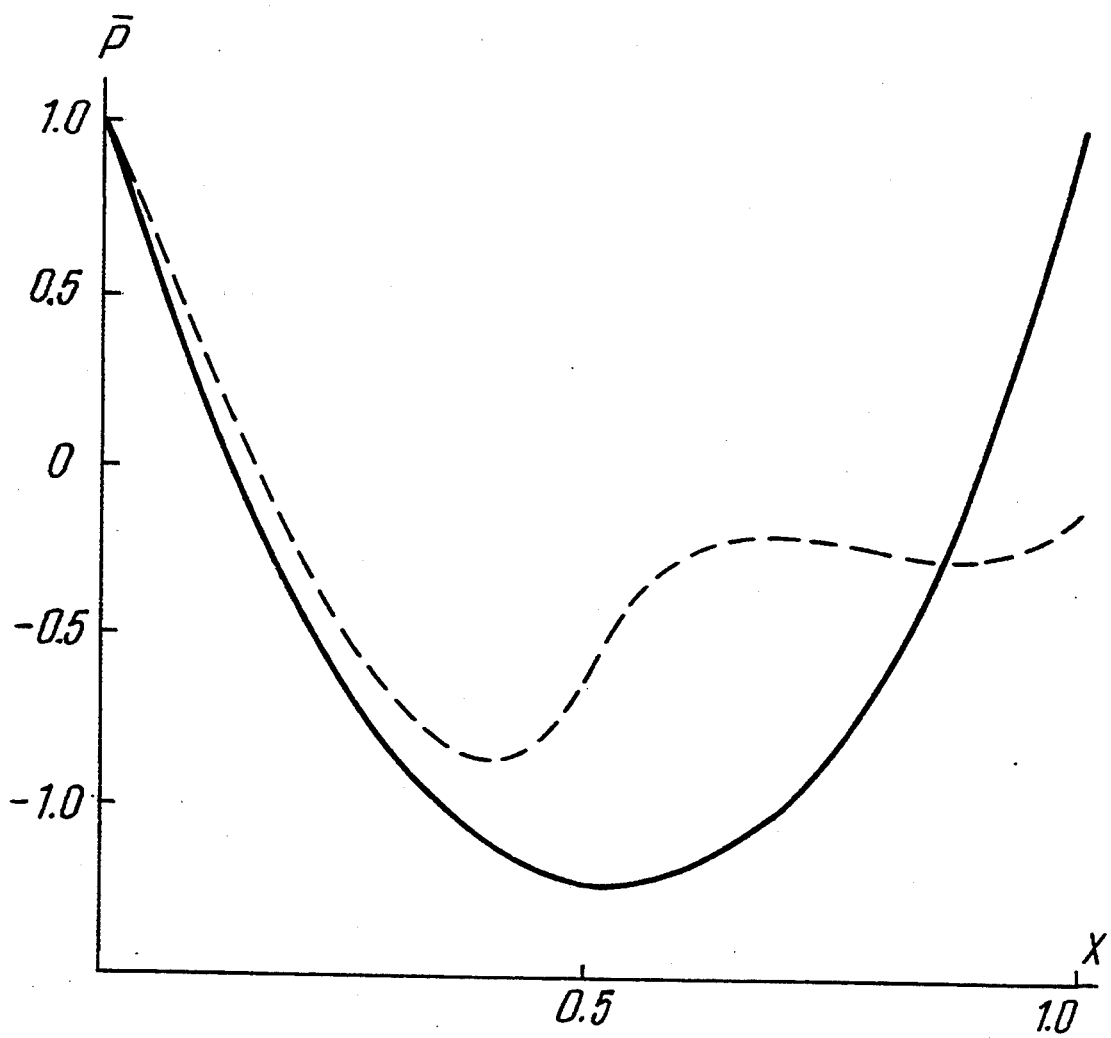
FIG. 4 illustrates pressure distribution over the surface of a thick aerodynamic airfoil in case of a separated flow over said airfoil (shown with a dotted line) and a nonseparated flow over said airfoil (shown with a solid line).

The device for boundary layer control consists of a number of vortex chambers 1 arranged in tandem in the aircraft rear. The interior spaces of the chambers accommodate streamlined bodies 2 which establish an annular duct 3 with the chamber walls. The chambers communicate with a low-pressure source 4, while each of the chambers is provided with an ejector appearing as a duct 5 communicating the chamber interior with the flow-through portion of a gas-dynamic passage common to all the ducts and communicating to the low-pressure source 4. A first vortex chamber 6 may be isolated from said common passage (as shown in FIGS. 1 and 3), while the last chamber, which is devoid of an ejector and its suction duct, is in fact the initial portion of the gas-dynamic passage which is in effect a passage 7 and a receiver 8. The passage 7 merges with the receiver 8 through a diffuser 9. The interior of the receiver 8 communicates with the low-pressure area in the streaming-over airflow through slots 10 provided with controlled butterfly dampers 11. Controlled butterfly dampers 12, 13, 14 are provided in the gas-dynamic passage 7 and in the ejector ducts, respectively. An aircraft turbojet engine 15 with an ejector 16 may be used as a low-pressure source. The first vortex chamber 6 as along the airflow, when devoid of ejection air bleed, communicates with the receiver 8 through a duct 17.

The operating principle of the device for boundary layer control, according to the invention, is as follows.

Once the engine 15 has been started a low pressure is applied from the ejector 16 to the receiver 8, the diffuser 9, and the passage 7. The pressure level in the passage 7 increases towards the trailing-edge vortex chambers following approximately the same law as governs the pressure rise in the external airflow towards the trailing-edge aerodynamic surface.

The diffuser 9 communicating the passage 7 with the receiver 8 reduces the velocity of the air being sucked off and increases the pressure in the receiver 8, thereby improving the operating conditions of the ejector 16 at the inlet of the turbojet engine diffuser, thus decreasing the loss of the engine due to a reduced level of its throttling.

On putting the source of air bleed in a low pressure level extends to the interior spaces of the vortex chambers, whereby air flows over from the wall boundary area to the source of air bleed.

The gas velocity in the boundary layer increases with an increase level of air bleeding from the interior spaces of the vortex chambers. As soon as the level of air bleeding reaches a certain value the boundary layer gets attached to the aircraft surface and a pressure with a positive gradient along the airfoil trailing edge is realized on that surface. The boundary layer attachment to the aircraft surface can be judged by the pressure measured in the airfoil trailing edge. An invariable pressure value on the airfoil surface when the air bleeding rate is increased is indicative of a non-separated airflow over said surface and of the onset of bound vortices in the vortex chambers. Checking for reliable boundary layer attachment to the aircraft surface against the value of the pressure on the airfoil trailing-edge surface is not, however, a single method. Used as such a control parameter may be the aircraft flying speed, inasmuch as boundary layer separation under steady flight conditions leads inescapably to reduction of the aircraft flying speed due to an increased aerodynamic drag.

Once the airflow has been attached the air bleeding rate is reduced, with the result that the air bleed intensity through the intake opening of the vortex chamber is reduced. Inasmuch as the bleed-lip leading edge A of the intake opening features a lower pressure than that on the trailing edge thereof, so as soon as the intensity of the air bleeding drops down to a certain level, air admission to the vortex chamber from the bleed-lip leading edge A ceases completely but continues from the trailing edge B. Further reduction of the air bleed level leads to intensification of the air circulatory flow in the vortex chamber (that is, of the bound vortex), said flow being maintained by virtue of a pressure differential between the leading and trailing bleed-lip edges of the chamber intake opening. In this case the front portion of the chamber intake opening (along the edge A) functions as an air blow-in duct, while the rear portion of the intake opening (along the edge B) functions as an air suction-off duct.

Then the air suction-off level is reduced to minimum air bleed rate values at which nonseparated airflow over the airfoil still takes place. Once the airflow has started separating the pressure level at the airfoil trailing-edge points (or the flying speed of the aircraft) starts dropping.

In order to reduce power consumption for the air bleed source an air ejecting suction from the vortex chambers is established. To this end, a common airflow is formed in the airfoil trailing edge by virtue of a positive pressure gradient realized on the airfoil surface when streamed without airflow separation, said common airflow being directed from the trailing edge cell to the first one. The pressure gradient adds to the airflow velocity, and the pressure at the outlet of the vortex chamber drops in a direction from the airfoil trailing edge. As a result, a pressure differential is built up at the inlet and outlet of the vortex chamber, required for gas ejection from the interior thereof.

Control of the process stated hereinbefore is effected with the air of the butterfly dampers 12, 13, and 14 and the ejectors 6.

Figure 2:
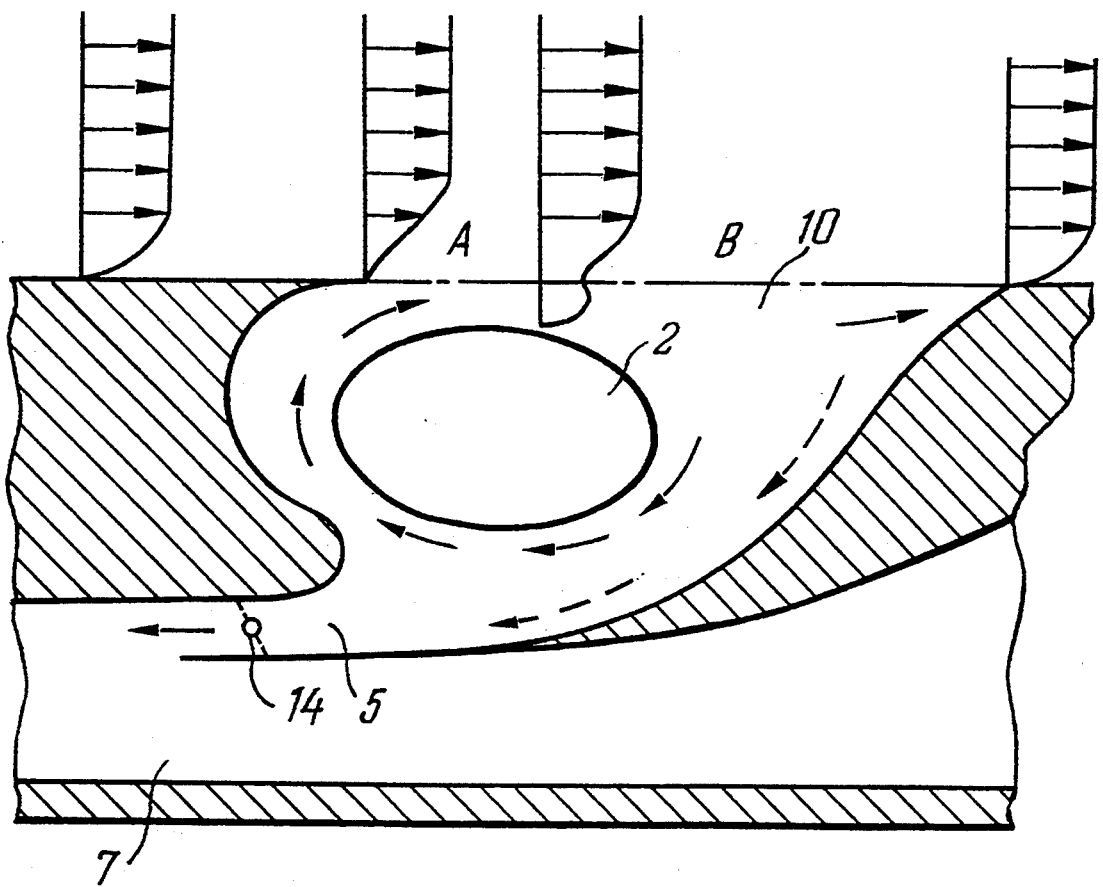
FIG. 2 is a sectional view of a vortex chamber with an ejecting duct, showing a velocity profile in the well area applied in several airflow sections.

With the aircraft taking off the butterfly dampers are opened completely so that air is vigorously sucked off (as shown with the dotted lines in FIG. 2) through the air bleed-lip edges A and B of the vortex chambers. In this case the amount of air sucked off in the boundary layer control system is too large and fails to provide an optimum operating mode of the system. The actual operating mode differs most widely from the optimum one at low flying speeds of the aircraft. However, such a mode facilitates stable airflow attachment to the airfoil trailing-edge surface at large magnitudes of the angle of attack, gusts, lateral wind blows, and other perturbing factors. As the aircraft gains speed the difference between the actual mode of operation of the boundary layer control system from an optimum one gets narrower, whereas the angle of attach and other perturbing factors decrease, too.

The operating mode of the boundary layer control system gets optimized in a cruise mode of the aircraft. To this end, a search is carried out for an optimum position of the dampers 13 under the conditions of a maximum pressure on the airfoil trailing-edge surface or a maximum aircraft speed, the power rating of the engines remaining invariable and the other aircraft controls being in a fixed position. The fact that the prerequisite of a maximum aircraft flying speed is selected as a prescribed function makes it possible to take account of the influence of the air bleed level from the vortex chambers on pressure distribution over the aircraft aerodynamic surface, that is, to allow for the influence of the air bleed on the amount of the profile and induced drag. Furthermore, account is taken of the influence produced by the air bleed on the value of the friction force in the area of situation of the vortex cells and on the amount of thrust lost by the engines.

With the dampers 13 assuming an optimum position, stable bound vortices are established in the vortex chambers (indicated with the solid lines in FIG. 2), said vortices rotating under the action of a pressure differential effective in the external airflow attached to the airfoil surface. Inasmuch as the level of air bleed is in direct dependence on the position assumed by the damper 13, an optimum position of the latter corresponds to a minimized total drag, that is, to the flight conditions at the maximum aerodynamic fineness ratio.

At the final stage of aircraft landing the aerodynamic drag is to be increased, which can be performed by partial airflow separation in the airfoil trailing-edge surface. To this aim, the level of air suction is decreased by closing the dampers 14 or the damper 12 in the passage 7. Opening of the slots 10 is also conducive to formation of a local flow separation on the airfoil trailing-edge surface.

In case of emergency shut-down of some of the aircraft engines, the running engines should ensure a required degree of rarefaction in the receiver. For this purpose the position of the dampers 13 in the gas passages of the running engines is to be changed, whereas the dampers 13 in the gas passages of the shut-down engines are to be closed.

In case of emergency shut-down of all the aircraft engines, all the dampers 13 should be closed and the dampers 11 should be opened. Under such conditions the vertex chambers continue operating under the action of a pressure differential between the area of maximum rarefaction on the aircraft fuselage and the pressure near the airfoil trailing edge. It is by virtue of said pressure differential that air flows along the diffuser duct 9 and thus air continues to be sucked off from the vortex calls with the aid of the matching ejector 5.

To provide normal operation of the turbojet engine 15 under starting conditions, use is made of the controlled dampers 11 situated in the slots 10 of the receiver 8. With the dampers 11 open rarefaction at the inlet of turbojet engine diffuser is reduced, thus preventing possible surge of the power plant compressor. Under nominal operating conditions of the boundary layer control system the controlled dampers 11 enable part of the sucked-off air to be bled from the receiver 8 through the slots 10 to the low-pressure area in the external airflow, thus cutting down power consumption for air suction.

INDUSTRIAL APPLICABILITY

Design and experimental studies carried out on the basis of engineering and development work give evidence of a high level of technical and performance characteristics of an air-craft equipped, in particular, with the aforedescribed boundary layer control system, that is, the aerodynamic fineness ratio under cruise conditions of flight is from 18 to 25.

We claim:

1. A method for controlling the boundary layer on a rear airfoil surface of an aircraft comprising the steps of:
   providing vortex chambers within the rear airfoil surface, each vortex chamber including a streamlined body disposed therein;
   sucking air from the chambers; forming bound vortex flows within the chambers and around the streamlined bodies under the effect of a pressure gradient effective in an external airflow; and
   controlling a rate of air suction from the chambers to minimize energy consumption for maintaining a non-separated airflow over the rear air foil surface.

2. An airplane having a boundary layer control system comprising:
   a lifting wing having an upper surface and a trailing edge portion facing a boundary layer; and dynamic boundary layer control means including:
   (i) a plurality of vortex chambers consecutively disposed within said trailing edge portion, said chambers having walls defining spaces that open toward the boundary layer;
   (ii) a streamlined body, having a surface, located within each vortex chamber;
   (iii) an annular duct formed between each vortex chamber wall and the corresponding streamlined body surface; and
   (iv) means for controlling an airflow velocity within the annular ducts.

3. An airplane having a boundary layer control system comprising:
   a lifting wing having an upper surface and a trailing edge portion facing a boundary layer;
   a turbojet engine power plant;
   a low pressure source; and dynamic boundary layer control means including:
   (i) a common passageway;
   (ii) a plurality of vortex chamber consecutively disposed within said trailing edge portion, said chambers having walls defining spaces that open toward the boundary layer and at least a portion of said chambers communicate with said low pressure source via said common passageway;
   (iii) a streamlined body, having a surface, located within each vortex chamber;
   (iv) an annular duct formed between each vortex chamber wall and the corresponding streamlined body surface; and
   (v) means for controlling an airflow velocity within at least a portion of the annular ducts comprising ejectors and controllable butterfly dampers located within the common passageway.

4. The system according to claim 3, wherein each of said ejectors comprises:
   an exhaust duct connecting the space of the vortex chambers to the common passageway to place the chambers in communication with said low pressure source.

5. The system according to claim 3, wherein the common passageway includes an inlet portion formed as a receiving chamber and a diffuser located between the passageway and the receiving chamber.

6. The system according to claim 3, comprising
   slots formed within said lifting wing; and
   controllable butterfly dampers disposed within the slots to control the flow from the common passageway to a rarefaction area.

7. The system according to claim 6, wherein the slots are formed in said upper surface of said wing.

8. The system according to claim 5, wherein one of said vortex chambers is isolated from the common passageway and includes a separate duct that admits air from said receiver tangentially into the vortex chamber space toward the boundary layer.

9. The system according to claim 8, wherein said low pressure source comprises a turbojet engine ejector positioned at one of an engine inlet, an engine outlet and an engine gas passage.

10. A method for controlling the boundary layer on an aerodynamic surface of an aircraft comprising the steps of:

forming bound vortex flows in chambers disposed within a trailing edge portion of the aerodynamic surface;

sucking air from the chambers;

controlling the rate of air suction from the chambers by:
(i) gradually increasing the rate until bound vortex flows appear in the chamber; and
(ii) maintaining the rate at a level so that a non-separated air flow over the aerodynamic surface is preserved;

measuring the pressure in the trailing edge portion; and identifying non-separated airflow over the aerodynamic surface based on a maximum pressure value.

11. A method for controlling the boundary layer on an aerodynamic surface of an aircraft comprising the steps of:

forming bound vortex flows in chambers disposed within a trailing edge portion of the aerodynamic surface;

sucking air from the chambers by ejection bleeding, at minimum rates of suction;

controlling the rate of air suction from the chambers by:
(i) gradually increasing the rate until bound vortex flows appear in the chambers; and
(ii) maintaining the rate at a level so that a non-separated air flow over the aerodynamic surface is preserved; and combining the ejected air in a common passageway with air bled from other chambers located closer to the trailing edge portion.

* * * * *